United States Patent [19]

Schwartz

[11] Patent Number: 4,485,289

[45] Date of Patent: Nov. 27, 1984

[54] WELDING SYSTEM

[76] Inventor: Charles A. Schwartz, c/o C. A. Schwartz Company, 23366 Commerce Park Rd., Beachwood, Ohio 44122

[21] Appl. No.: 402,890

[22] Filed: Jul. 29, 1982

[51] Int. Cl.[3] .............................................. B23K 11/10

[52] U.S. Cl. ...................................... 219/90; 219/116; 336/62

[58] Field of Search ................ 219/90, 89, 116, 86.25, 219/86.31; 336/62, 83, 61

[56] References Cited

U.S. PATENT DOCUMENTS 3,503,026 3/1970 Geisel et al. .................... 336/232 X 4,233,489 11/1980 Schwartz ........................ 219/116 X 4,393,293 7/1983 Inoue et al. .......................... 219/90

*Primary Examiner*—C. L. Albritton

*Assistant Examiner*—Catherine Sigda

*Attorney, Agent, or Firm*—Cullen, Sloman, Cantor, Grauer, Scott & Rutherford

[57] ABSTRACT

An improved electrical resistance welder which provides the same welding current at the welding electrodes as prior welding device while requiring less input current, and providing lower reactance, less weight and overall increased efficiency. The resistance welder includes a transformer having a pancake type primary winding formed of a metal tube thrugh which a coolant is flowed. Portions of the primary winding are adjacent the transformer secondary and thus the primary winding also functions as a heat sink to cool the secondary.

9 Claims, 6 Drawing Figures

WELDING SYSTEM

BACKGROUND OF THE INVENTION

The present invention relates to an improved electrical resistance welder and, more particularly, to a reduction in the weight and reactance and an increase in efficiency of a resistance welding gun.

Electrical resistance welding is, of course, well known. Resistance welders are frequently used in the fabrication of vehicles to weld together parts of the vehicle such as floor pans, fenders, roofs, hoods, doors, frames, etc.

Many types of portable resistance welding guns have been designed to assist in the welding of large body portions of vehicles. These portable welding guns allow the welding electrodes to be taken to the workpiece.

One problem in a resistance welder is that each structural member, i.e., each arm of the welding gun, is inherently both a resistance and a reactance. Furthermore, in a welding gun having a wide throat, the air gap adds a substantial reactance of the welding circuit. In fact, it is often the case that in a resistance welder, the welding gun itself provides a resistance and a reactance which far exceeds the resistance and reactance of the load. In other words, the resistance and reactance of the equipment far exceeds the resistance and reactance of the material being welded.

In a conventional resistance type welding system, normally less than 10% of the total power requirement is used to produce the weld and the remaining 90% of the total power is needed to overcome the resistance and reactance of the welding gun itself plus any resistance and reactance of the cable used to interconnect the welding gun to the power transformer. Thus the power loss, resulting from a current drain, in the transfer of the welding current to the electrodes is proportional to the resistance and reactance of the throat of the welding gun and of the arms of the welding gun. Furthermore, there is also a substantial power loss in the cable itself when a cable is used between the welding gun and the power transformer.

While a basic objective in a resistance welder is to conserve energy by the reduction of line current, there are various conflicting subproblems which occur. Specifically, the minimum line current necessary for welding is related to the load current needed for welding in proportion to the transformer "turns ratio". To minimize line current, a higher "turns ratio" is needed. However, in order to provide a sufficient secondary voltage to overcome the total impedance of the system, a lower "turns ratio" is needed. But once a lower "turns ratio" is provided, a higher line current becomes necessary.

Thus, the desire to reduce line current has been frustrated by the necessity of a sufficiently high line current in conjunction with a sufficiently low "turns ratio" to provide not only the necessary power for welding but also the necessary secondary voltage to overcome the impedance of the welding system.

In my prior U.S. Pat. No. 4,233,488, of Nov. 11, 1980, I have provided a first solution for minimizing the impedance of the welding gun. The present invention provides yet another solution to the aforementioned problem.

Specifically, in considering the prior art resistance welders, it has been customary to provide a cooling member through which a coolant is flowed for the purpose of cooling the transformer of the welding gun. The cooling member must be thermally conductive, to draw the heat from the transformer, and a cooling fluid or coolant is flowed through the cooling member. Typically, copper tubes are used as the cooling member, because of the high thermal and electrical conductivity of copper. However, the use of a cooling member, particularly a metal cooling member, increases not only the weight but also the resistance and reactance of the welding gun.

SUMMARY OF THE INVENTION

The present invention overcomes the problems of the prior art by completely eliminating the previously used separate cooling member for the primary of an electrical resistance welding gun, while still providing a flow path for a coolant to cool the primary. This sustantially reduces the weight, resistance and reactance of the welding gun thus reducing the line current and power necessary to operate the electrical resistance welder.

Specifically, the present invention is directed to a method, apparatus and system for maintaining the function of cooling by providing a primary transformer winding formed of a hollow tube and flowing the coolant through the primary winding. Thus, the primary winding is directly cooled by the flow of a coolant. Since, in a resistance welder, a portion of the primary coil is adjacent the transformer secondary, the primary coil also serves as a heat sink to draw heat from the secondary onto the primary. The flow of coolant through the hollow primary coil cools both the primary and the secondary and thus generally eliminates the need for a separate cooling member of the transformer secondary.

Thus, the present invention provides a new approach to reducing the weight and resistance of electrical resistance welders and permits easier manufacture and assembly of electrical resistance welders.

BRIEF DESCRIPTION OF THE DRAWINGS

The various objects and advantages of the present invention, together with other objects and advantages which may be attained by its use, will become more apparent upon reading the following detailed description of the invention taken in conjunction with the drawings.

In the drawings, wherein like reference numerals identify corresponding parts.

DETAILED DESCRIPTION OF THE INVENTION

Figure 1:
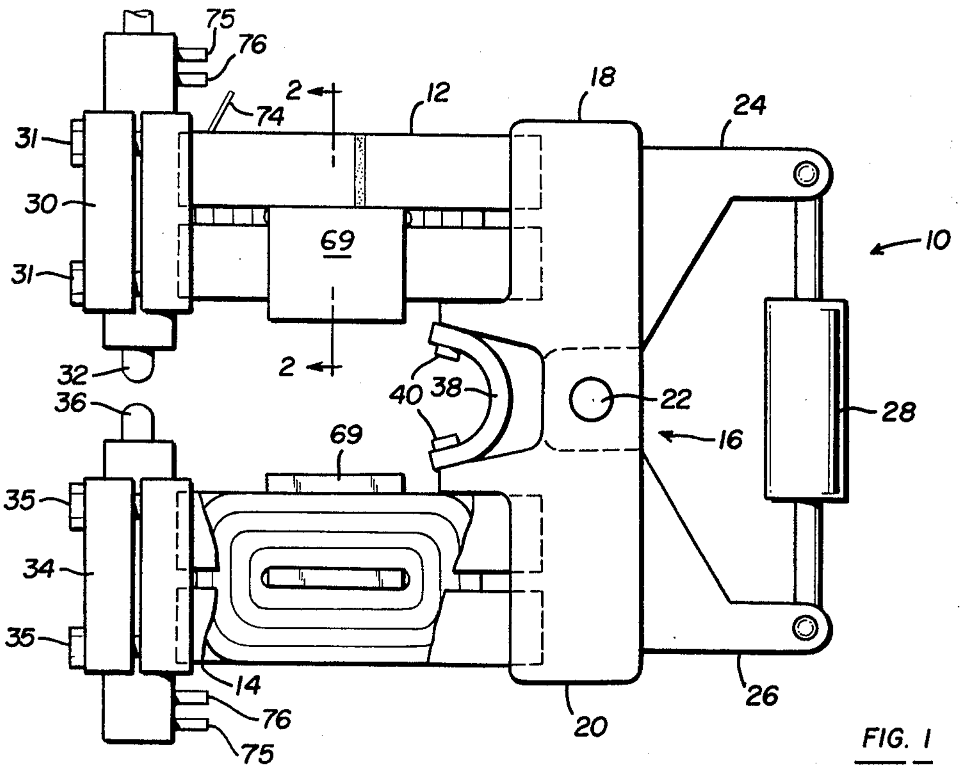
FIG. 1 is a side elevation view, partly broken away, of a portable resistance welding gun of the present invention.

The present invention is the culmination of a continuing effort to provide additional current at the electrodes of a welder while decreasing the power consumption without sacrificing quality of the weld. With reference to FIG. 1, a portable welding gun 10 of the present invention includes a gun body having an upper arm 12 and a lower arm 14. The upper and lower arms are interconnected by a vertical member 16 and the two arms 12, 14 and the vertical member 16 comprise a U-shaped throat. The vertical member 16 includes two castings 18, 20 which are pivoted together at a pivot 22. Each casting includes a rearward extension 24, 26, respectively and a hydraulic piston or fluid actuated cylinder 28 is connected between the extensions. The cylinder 28 may be operated by any conventional fluid including air. Actuation of the cylinder 28 serves to more the upper and lower arms 12, 14 closer to or farther away from each other by pivoting the same about the pivot 22. In this fashion, the welding gun may be fully opened up by drawing the extensions 24, 26 toward each other and the gun may then be inserted over a workpiece. Thereafter, the arms 12 and 14 are moved toward each other so that welding may be accomplished.

The upper arm 12 includes a first electrode holder 30, such as an ejector type holder, at the opposite end of the arm from the vertical member 16. The electrode holder may be secured in a preselected position, by conventional techniques as set forth in my prior patent, or by bolts 31, and a first or upper welding electrode 32 is secured in the upper electrode holder.

Similarly, the lower arm 14 includes a second electrode holder 34 positioned by bolts 35 and a second or lower welding electrode 36 is secured in the electrode holder 34. A flexible electrical connecting shunt 38 is secured by bolts 40 at each end of the shunt to the upper and lower castings 18, 20, respectively, so that the upper arm and lower arm may be electrically connected together. The welding gun 10, including the arms, vertical member, electrode holders and electrodes are, of course, made of a metal which exhibits a high degree of electrical conductivity.

According to the principles of the present invention, a first linear transformer is provided which also functions as a structural part of the upper arm 12. A second linear transformer is provided to function as a structural part of the lower arm 14. It should be pointed out at this time that the presently described structure may be made by eliminating the pivot 22 and providing a different technique and structure for accomplishing movement of the electrodes toward and away from each other such as, for example, as set forth in my prior patent.

Figure 2:
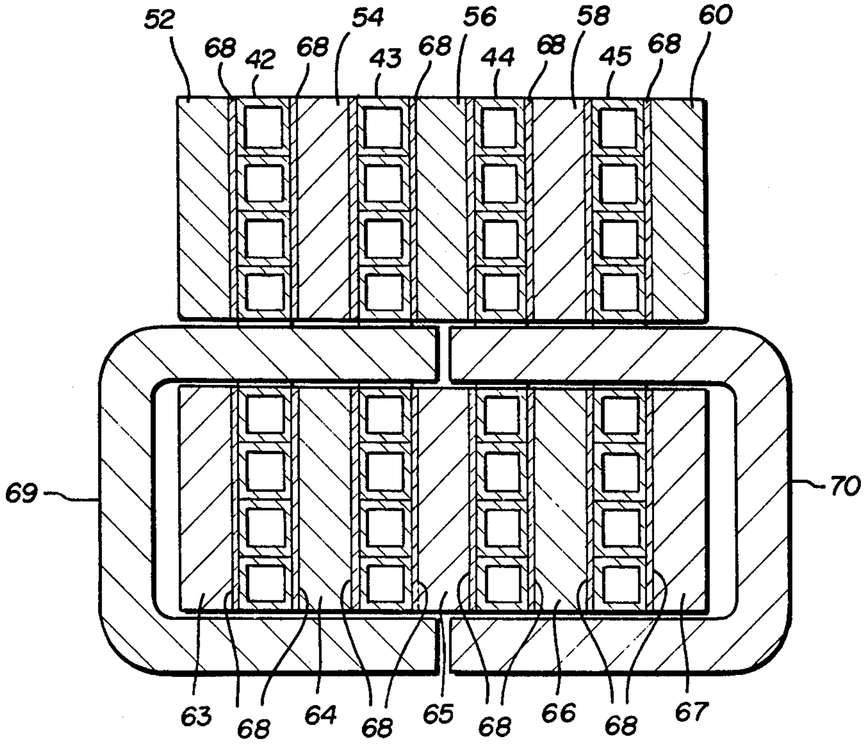
FIG. 2 is an enlarge cross-sectional view of the upper arm of the resistance welding gun of FIG. 1 as seen in the plane of arrows 2—2 of FIG. 1.

With reference to the Figures, one of the linear transformers of the present invention will now be explained. Specifically, the linear transformer which is part of the upper arm 12 is illustrated in FIGS. 2 through 6 and it should be appreciated that the linear transformer of the lower arm 14 will be the same although its orientation is inverted relative to the orientation of the transformer of the upper arm. It must be appreciated, therefore, that the cross-sectional view of FIG. 2 shows the relative position of the parts with respect to the upper arm 12. The linear transformer of the present invention includes a plurality of primary windings or coils 42, 43, 44, 45. Four such coils are illustrated in FIG. 2 and it should be appreciated that more or fewer primary coils or windings may be used. Each primary coil is formed as a flat, oval pancake comprising a plurality of turns of primary winding. According to the principles of the present invention, the primary winding is formed of hollow copper tubing or wire such as one-quarter inch square or three-sixteenths square, and the tubing has one-eighth inch square hollow core. The tubing is insulated before being wound into the flat, oval pancake form. Typically, a synthetic varnish such as polythermalse, an aramide, is used as the insulating material although other insulating coatings are well-known for use in electrical apparatus.

Figure 3:
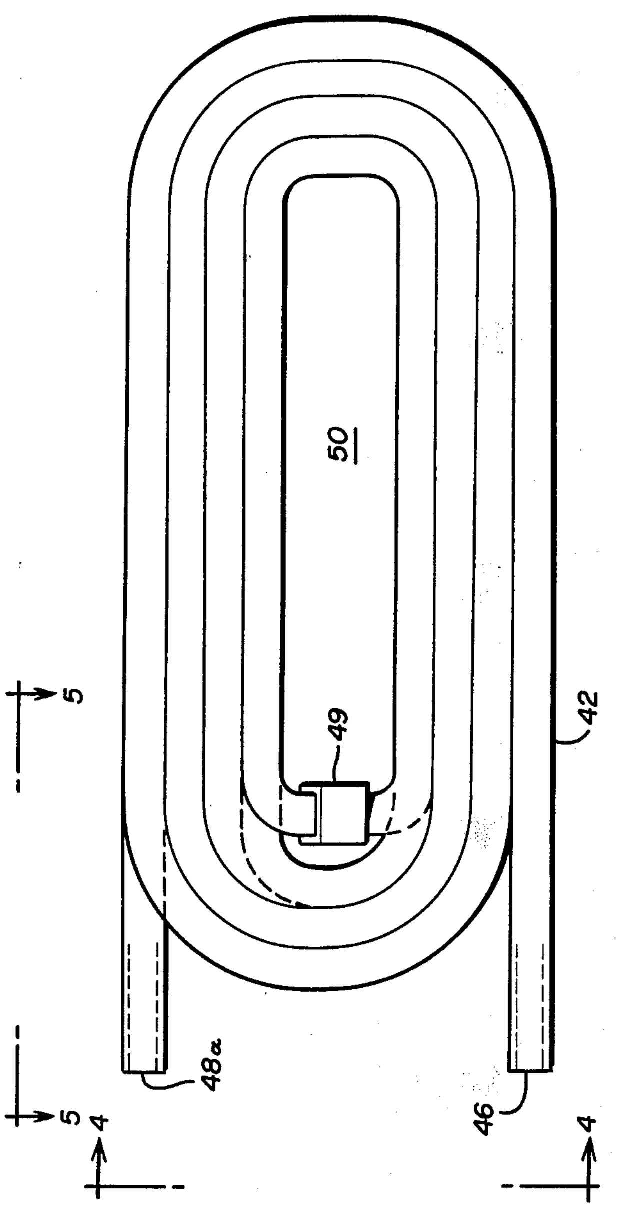
FIG. 3 is a front elevation view of a pair of primary windings of the transformer of the electrical resistance welder of the present invention.
Figure 4:
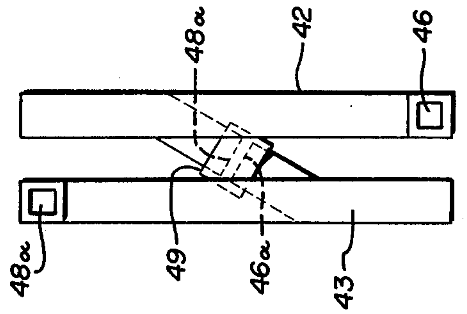
FIG. 4 is a side elevation view of the pair of primary windings as seen in the plane of arrows 4—4 of Figure.
Figure 5:
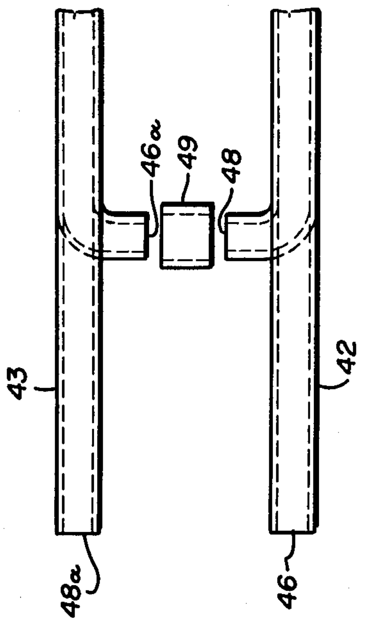
FIG. 5 is an exploded partial top elevation view of the pair of primary windings as seen on the plane of arrows 5—5 of FIG. 3.

Each pancake-type primary coil is formed or wound in the same fashion and the primary coils are joined in alternating fashion so that the current flow is always in the same direction, e.g., clockwise in FIG. 3. Each coil is initially a long straight section of hollow metal tubing with first and second ends 46, 48. The first coil is wound as a flat pancake with end 46 extending outwardly of the coil and end 48 at the center. Coil 43 is wound as a flat pancake with end **46*a* at the center and end 48*a* extending outwardly. The two center portions of coils 42 and 43, i.e., ends 48 and 46*a* are joined by a hollow metal connector 49 which may be swaged onto the ends of the coils. Prior to forming the coil as a pancake, the tubular wire is wrapped about a mandrel into the flat oval pancake type configuration. Thereafter, the mandrel is removed which results in a flat pancake coil which is a primary winding having a hollow oval core 50**.

Preferably a pair of coils may be wound from a double length tube by starting in the middle and winding one part of the tube clockwise around a mandrel and the other part of the tube counterclockwise about the mandrel. This eliminates the need for the connector 49.

To provide additional structural support for the primary windings, a series of thin, flat rectangular metallic plates 52, 54, 56, 58, 60 are provided with one primary winding between each pair of adjacent plates. These support plates are longer than the coiled length of a primary winding and of a height less than half the height of the primary winding. Each of these plates is positioned on opposite sides of the upper part of the primary winding leaving the bottom part of the primary winding and the hollow core 50 of the primary coil exposed. To avoid a short circuit condition during operation of the welder, each of the support plates is severed or cut as at 61 and then filled with a rigid electrically insulating material such as a rigid urethane, as at 62, to retain structural rigidity and integrity of the support plates. After the support plates and primary coils are properly positioned relative to each other the composite assembly may be taped with insulating material.

The secondary for the linear transformer of the present invention includes a plurality of flat metal plates 63, 64, 65, 66, 67 each of which plates is secured on opposite sides of a primary winding below the hollow core 50. If there are four primary coils there are preferably five secondary windings or plates. Since each primary coil is between two secondary plates, the number of plates should be one more than the number of primary windings. An electrically insulating and thermally conductive material 68 is placed between each side of the pancake coil and the support and secondary plates, as is often done is all transformers, and a typical material is polyester cloth sheets having a thickness of 0.02–0.03 inches.

Lastly, each transformer includes an iron core comprising two core halves 69, 70. Each of these iron core halves is formed as an elongated U-shaped member and when the halves are assembled together they form an elongated hollow, rectangular member. One pair of the legs of each of the core members are inserted through the hollow portion 50 of each primary coil and the secondary of each transformer is positioned interiorly of the iron core halves.

To summarize the construction of the linear transformers, each primary is constructed by coiling tubular hollow copper wire, coated with varnish, about a mandrel to obtain the desired number of turns. The mandrel is removed and this results in a pancake type coil with an opening 50 in the center. After the support plates for the primary, and the secondary transformer plates and insulating sheets are placed in position, as will be more fully described, an iron core is slidably inserted in the opening 50 provided in the primary coils. Each half the iron core extends down one side of the secondary and across half of the bottom of the secondary and is inserted half way through the openings 50 in the primary pancake type coils. The entire linear transformer may be encapsulated in a suitable insulating material as described in my prior patent or may alternatively be wrapped with an electrically insulating tape.

As may be appreciated, the electrical current drawn by the welding gun 10 causes the temprature of the entire gun to rise. The heat build up in the gun militates against continued efficient operation of the welding gun. For this reason, welding guns of this type have heretofore been provided with cooling means such as a recirculating fluid coolant which flows through suitable passages within an auxiliary cooling member as described in my prior patent. The fluid is generally water.

According to the principles of the present invention, in the preferred embodiment I have eliminated completely the need for an auxiliary cooling member and I flow the conduit directly through the hollow wire of each pancake type primary winding. The coolant flowing through each primary coil directly cools each primary. In addition, since part of each primary is adjacent to two secondary members, as previously described, each primary also functions as a heat sink to draw heat from the secondary and thus the coolant flowing through the primary wire also cools the secondary. Since the sheets 68 are thermally conductive, the sheets do not impede the ability of the primary to function as a heat sink for the secondary.

Thus, it may be appreciated that a simple manifold, less complicated than the type previously used with auxiliary cooling members as described in my prior patent, may be utilized in conjunction with the primary coils of the present invention to control the flow of coolant through the primary coils. Of course, the manifold described in my prior patent may be used in the present invention if desired. Since the current must flow the same way through all the coils of each primary 42, I provide an adapter 71 illustrated in FIG. 6. Adapter 71 is a short hollow copper tube, typically of the same material as the coils, and is connected between the second end of the second primary coil and the first end 48 of the third primary coil. That is, since the primary coils are wound in pairs, an adapter is provided to interconnect the first pair of coils to the second pair of coils. Thus, both the current and the coolant flow in the same direction in all primary coils. The particular technique for manifolding and controlling the flow is, of course, the same as it would be if auxiliary cooling members were provided and hence the manifolding techniques are not described in any greater detail. For the purpose of illustration, however, coolant lines 72 and 73 are illustrated in FIG. 6 for connecting the circulating coolant to the coils.

As may be appreciated, the linear transformer in the upper arm 12 and the linear transformer in the lower arm 14 may be connected electrically through shunt 38 in series or parallel as required by the turns ratio of the transformers. The input power to the welding gun is provided through a sheathed cable 74 as described in my prior patent. A first complete electrical path, referred to as the power circuit, is provided which path includes the cable and all the primary windings. A second complete electrical circuit, often referred to as the welding circuit, includes the secondary "windings" or plates 63, 64, 65, 66 and 67, the metal electrode holders 30, 34 and the upper and lower electrodes 32, 36. The electrical connections to the primaries and from the secondaries to the electrodes, are not illustrated as they are conventional.

A pair of inlet and outlet tubes 75, 76 respectively, are provided for each electrode holder. The use of a water coolant for the coils and electrode holer will maintain the welding gun at a suitable temperature usually below 120° F.

Figure 6:
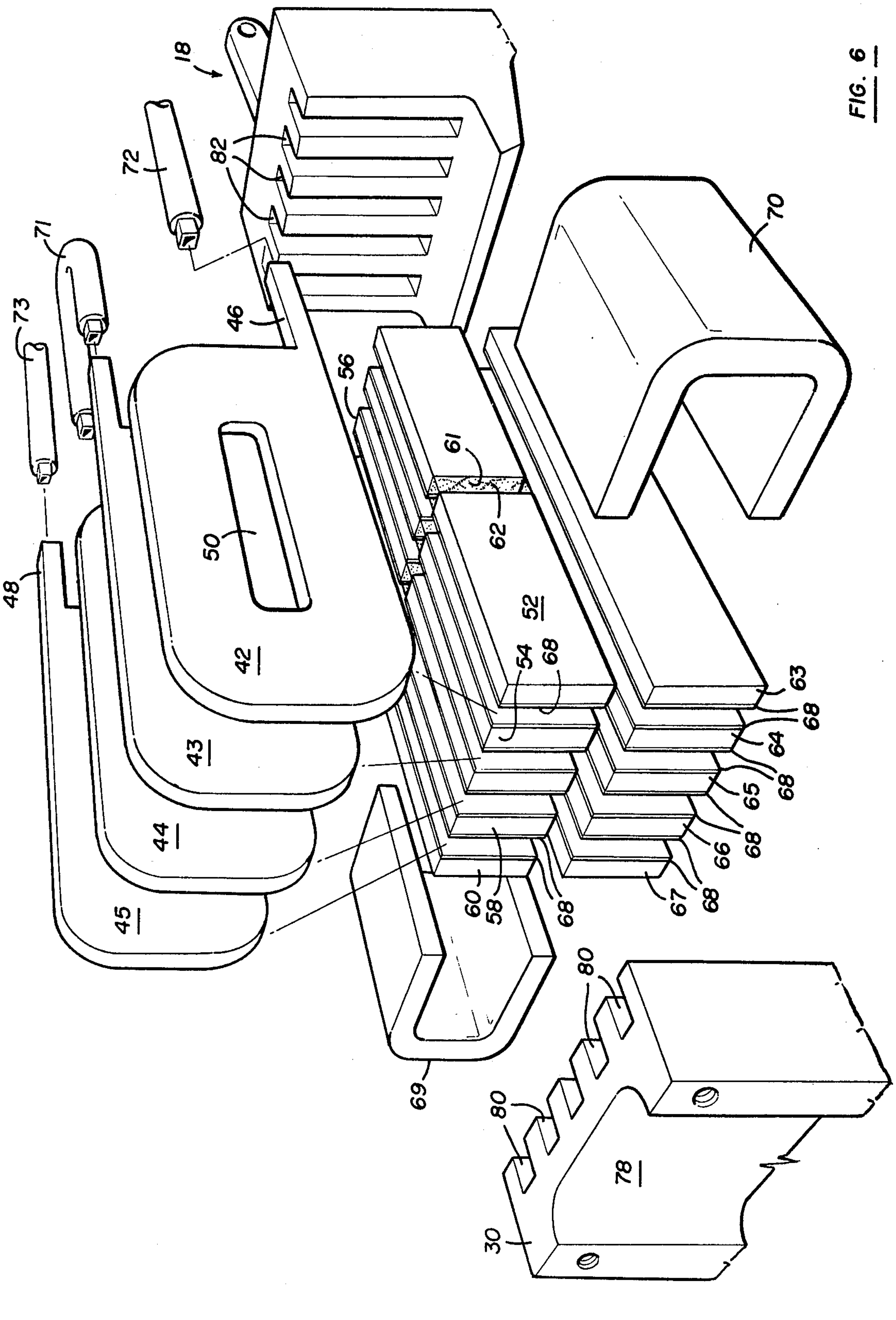
FIG. 6 is an exploded partial perspective view of one arm of the resistance welder of the present invention.

Reference should now be had to FIGS. 1 and 6 for a more detailed explanation of the structure of the resistance welder. It should be understood, however, that the following is only one method of fabricating the welder (or parts thereof) and that many other techniques may be employed without departing from the scope and spirit of the present invention. Each electrode holder 30, 34 is formed as a casting and the upper electrode holder 30 is partially illustrated in FIG. 6. The upper electrode holder includes a central bore 78 through which the electrode may be inserted and includes, at one side and more particularly the side of the holder facing the transformer, a series of elongated vertical slots 80. The number of slots is dependent upon the number of support plates and electrical secondaries utilized in a particular linear transformer. The electrode holder 30 may be a split metal casting with the parts secured by bolts 31. One end of each support plate for the primary, and one end of each secondary plate, is brazed within each of the slots 80.

Thus, one end of each of the support plates and secondary plates is secured to the electrode holder. Means are provided for securing the opposite end of each support plate and secondary plate to the vertical member 16.

Specifically, it will be recalled that the vertical member 16 is formed of upper and lower castings 18, 20. Each of these castings has suitable slots 82 facing the slots 80 in the electrode holder. FIG. 6 illustrates only the upper casting 18 or upper portion of the vertical member 16. The support plates for the primary coil as well as the secondary plates are similarly brazed or secured in the slots 82 in the casting 18. When a rigid plastic vertical member is used, a mechanical fastening by bolts through apertures in the vertical member and the plates may be provided.

The present invention provides excellent cooling for low and medium duty cycle welders. When the welder is operated at a high duty cycle if there are a large number of primary coils then there will still be sufficient cooling of the primary and secondary. If, however, the welder is operated at a high duty cycle with only a few primary coils, it may be desirable to add an auxiliary cooling system for the secondary plates. One such system which could be employed would be to use that part of the cooling system described in my prior patent and illustrated interiorly of the iron core.

The unique structure of the present invention provides yet another benefit, namely, that higher line current frequencies may be used. The impedance vector diagram of the present invention demonstrates that the reactance of the welder (due to the structure) is small in proportion to the resistance at 60 hertz. A large increase on the frequency (e.g., a seven-fold increase to 420 hertz) will, of course increase the reactance but the total impedance is not increased seven-fold. Instead the impedance may only be doubled. Since higher line frequencies may be used to provide increased welding capabilities this provides yet another advantage for the present system since the volume or amount of iron necessary for the welder is drastically reduced compared to my prior welding system.

The foregoing is a complete description of a preferred embodiment of the present invention. Various changes and modifications may be made without departing from the spirit and scope of the present invention. Thus, the invention should be limited only be the scope of the following claims.

What is claimed is:

1. In an electrical, resistance type welding machine of the type including a linear transformer being a structural part of the welding machine and having a primary coil and a secondary member the improvement comprising:

said primary coil being formed of a hollow tubular conductive member having an interior bore which bore is also a cooling passage, said secondary member being disposed in heat transferring relationship to said primary coil; and, barrier means interposed between said primary coil and said secondary member for electrically insulating said primary coil from said secondary member, said barrier means having sufficiently high thermal conductivity to allow a substantial portion of the heat generated in said secondary member to be transferred through said barrier means to said primary coil, whereby secondary member is cooled by said cooling passage in said hollow tubular member.

2. In an electrical resistance type welding machine having an upper elongated body member, a lower elongated body member transversely spced apart from said upper body member and an intermediate body member, said upper, lower and intermediate body members forming a U-shaped structure each of said body members having a first end and a second end, a first electrode near the first end of said upper body member and a second electrode near the first end of the lower body member, the first and second electrodes being oppositely disposed relative to one another for welding, and at least one linear transformer being a structural part of the welding machine and having an elongated secondary and associated with said secondary, a primary coil having a predetermined multiplicity of turns, the improvement comprising:

said primary coil comprising a hollow tubular conductor with the hollow interior of said conductor providing a cooling passage for said primary, said cooling passage providing a path for a coolant for directly cooling the primary coil of said transformer, said secondary being disposed in heat transferring relationship to said primary coil; and, barrier means interposed between said primary coil and said secondary for electrically insulating said primary coil from said secondary, said barrier means having sufficiently high thermal conductivity to allow a substantial portion of the heat generated in said secondary to be conducted through said barrier means to said primary coil, whereby said secondary is cooled by said primary coil.

3. The invention as defined in claim 2 wherein at least a portion of the primary coil is adjacent the transformer secondary, said portion of said primary coil functioning as a heat sink to draw heat from said secondary, and said path for coolant for also cooling said secondary.

4. The invention as defined in claim 2 wherein said transformer includes a plurality of primary coils, each of said primary coils formed as a hollow tubular conductor with the hollow portion of each primary coil functioning as a cooling passage.

5. The invention as defined in claim 2 and further including a plurality of support members adjacent part of said primary coil, said support members and said primary coil comprising said elongated body member.

6. In an electrical resistance type welding machine of the type including at least one linear transformer, the linear transformer being a structural part of the welding machine and including a primary coil and a secondary member associated therewith, the improved method of cooling said transformer comprising the steps of flowing a coolant only through said primary coil, and conducting heat grnerated in said secondary member through an electrically insulated, thermally conductive barrier to said primary coil, whereby both primary coil and said secondary member are cooled by the coolant flowing through said primary coil.

7. The invention as defined in claim 6 wherein at least a portion of said primary coil is adjacent said secondary and said flowing of coolant through said primary coil cools said primary and said secondary.

8. A welding gun, comprising an upper elongated body member, a lower elongated body member, said upper and lower body members being pivotally interconnected to form a U-shaped structure and having portions located at the opening of the U-shaped structure that are adapted to carry a welding electrode, at least one linear welding transformer forming a structural part of one of the elongated body members and comprising a core of magnetic material, a primary winding having a plurality of primary coils, each primary coil being wound from a tubular conductor to provide at least a portion with a pancake configuration, a secondary winding having a plurality of plates respectively disposed in heat transferring relationship between said primary coils and connected to provide current to the portions of body members adapted to carry the welding electrodes, each secondary plate having two opposed planar surfaces to provide a large surface for transfer of the heat generated by the power loss of the plate, means disposed between said primary and secondary windings for electrically insulating said primary and secondary windings from each other and from the core, said insulating means being sufficiently thermally conductive to conduct a substantial portion of the heat generated in said secondary winding to said primary winding; and means to provide a flow of coolant through the primary coils to remove the heat generated in both of said transformer windings and welding gun.

9. The transformer of claim 8 wherein each of the primary coils is wound turn upon turn with the tubular conductor having a square perimeter, and the majority of secondary plates are located between two adjacent primary coils so that each generally planar side of a majority of secondary plates is thermally coupled with the substantially flat surfaces of the adjacent primary coil at each of its sides to permit increased heat transfer from the secondary winding to the coolant.

* * * * *